G. F. MILLER.
FILTER PRESS PLATE.
APPLICATION FILED JAN. 22, 1919.

1,330,331.

Patented Feb. 10, 1920.
2 SHEETS—SHEET 1.

Inventor
George F. Miller
By his Attorney

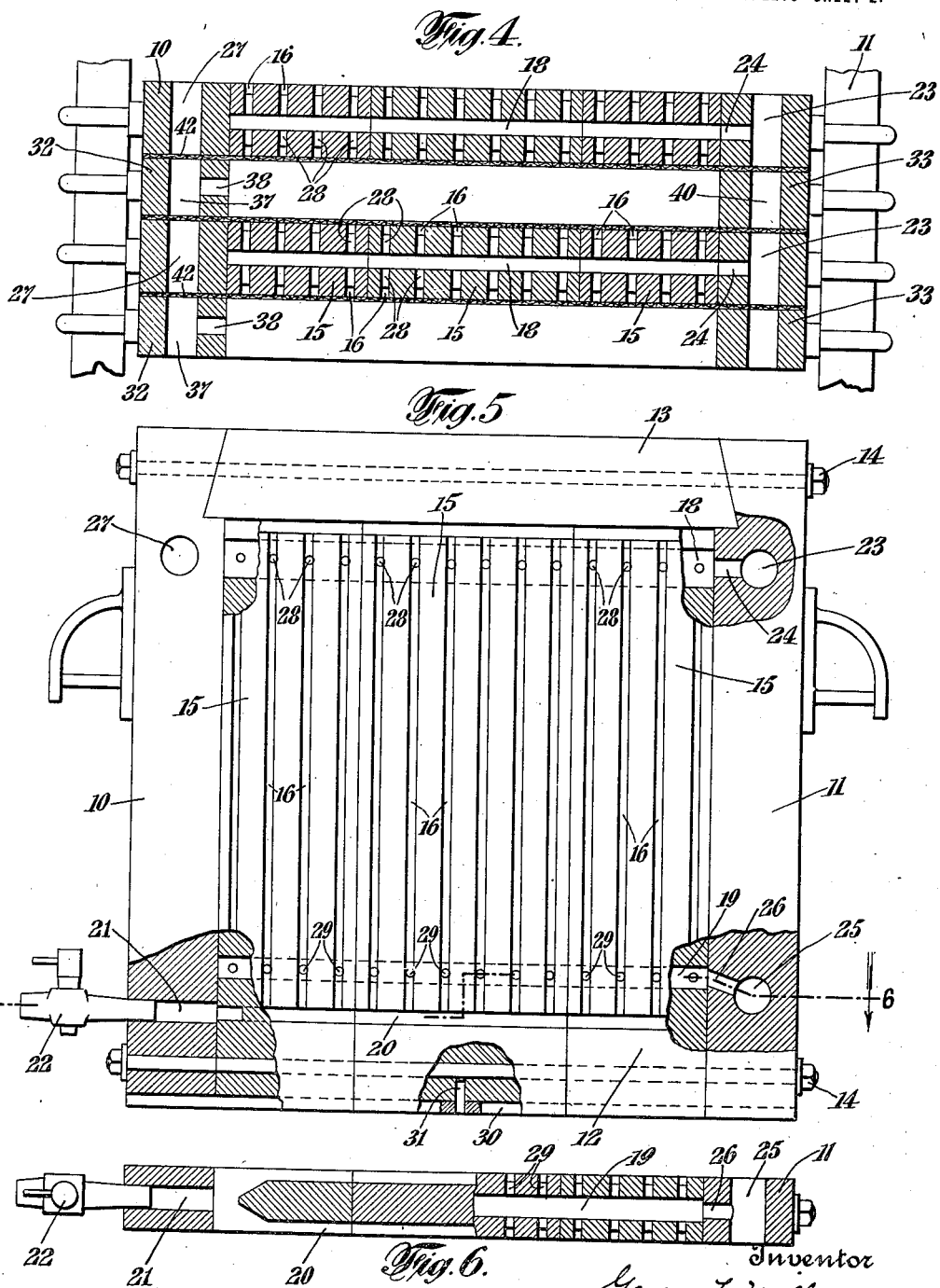

UNITED STATES PATENT OFFICE.

GEORGE F. MILLER, OF NEW YORK, N. Y.

FILTER-PRESS PLATE.

1,330,331.   Specification of Letters Patent.   Patented Feb. 10, 1920.

Application filed January 22, 1919. Serial No. 272,483.

*To all whom it may concern:*

Be it known that I, GEORGE F. MILLER, a citizen of the United States, residing in the city of New York, county of New York, borough of Manhattan, and State of New York, have invented certain new and useful Improvements in Filter-Press Plates, of which the following is a full, clear, and exact specification.

My invention relates to filter press parts and refers particularly to filter press plates.

The object of my invention is a filter press plate of such a construction that the washing process is greatly facilitated and the washing of the filter mass accomplished in a greatly decreased period of time and with greatly increased efficiency.

This and other objects of my invention will be evident upon a consideration of my specification, drawings and claims.

In a broad way, my invention comprises a filter-field wash water conduit, the cross-sectional area of which is greater than the cross-sectional area of the water-feed conduit.

The ordinary filter plate comprises a grooved field within a rigid frame, a series of conduits through the frame allowing of the passage of wash water into a field conduit within the field from which the water passes outwardly through openings in the field.

In the present known filter-fields, the field-conduit is of the same cross-sectional area as the water-field conduit extending from the main water supply in the frame to the field-conduit. In these constructions therefore, the water passes from the main water supply through a practically uniform conduit.

I have found that much superior results can be obtained by employing a field-conduit of greater cross-sectional area than the water-feed conduit leading into it. By this means I form a water reservoir from which the water flows through the holes in the field. The result of my device is that a much more uniform pressure is obtained throughout the field-conduit than can be obtained in the ordinary field-conduit, which results in a much more uniform passage of the water through the holes in all parts of the field, resulting in increased efficiency of the washing process, as it allows the washing to be done much more quickly and uniformly.

In addition to the above advantages, an additional advantage is gained in the construction of my device, particularly in the use of rectangular field-conduits, as there is a considerable saving of labor with the production of a much more accurately assembled device.

In the accompanying drawings, illustrating one form of my device, similar parts are designated by similar numerals:

Fig. 4 is a section through the line 4—4 of Fig. 1.

Fig. 5 is a vertical plan view of a filter-press plate of my invention.

Fig. 6 is a section through the line 6—6 of Fig. 5.

Figure 2:
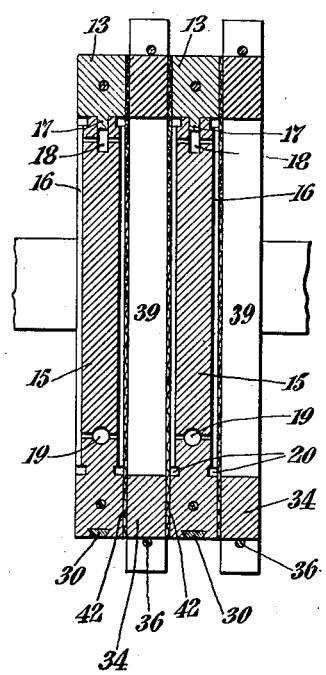
Fig. 2 is a section through the line 2—2 of Fig. 1.
Figure 1:
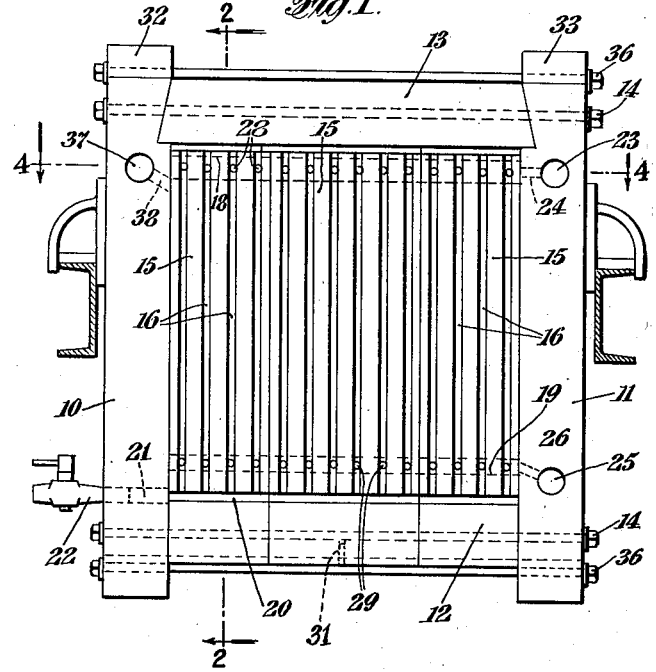
Figure 1 is a vertical plan view of a series of filter-press frames and a filter-press plate of my invention.

The particular filter-press plate of my invention, illustrated in the accompanying drawings, comprises a frame composed of the sides 10 and 11 and the top 13, the frame being held in rigid construction by the bolt-irons 14, 14. The field comprises the three members 15, 15, 15 carrying the grooves 16, 16, 16.

The top 13 has a longitudinal tongue 17 which fits within a recess within the upper portion of the field-members 15, 15, 15, allowing of the formation of the rectangular conduit 18. The lower portion of the field members 15, 15, 15 contains a conduit 19. A recess in the lower portion of the field members 15, 15, 15 forms a conduit 20, when the filter-frames and filter-plates are assembled. A conduit 21 within the side 10 connects the conduit 21 with the faucet 22. An opening 23 extends through the side 11 and is connected to the conduit 18 by means of the conduit 24. An opening 25 extends through the side 11 and is connected to the conduit 19 by means of the conduit 26. An opening 27 extends through the side 10. A series of conduits 28, 28 connects the conduit 18 with the grooves 16, 16 and a series of conduits 29, 29 connects the conduit 19 with the grooves 16, 16.

The lower ends of the sides 10 and 11 and the lower ends of the field members 15, 15, 15 are held together and maintained from warping by the dove-tail members 30, 30, preferably of hard wood, with a dowel-pin 31 extending through the member 30 into the field member 15.

Figure 3:
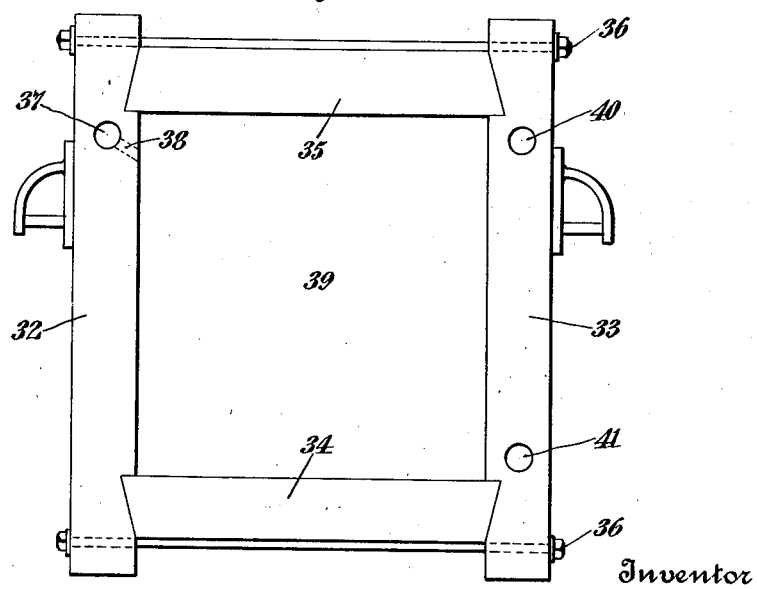
Fig. 3 is a vertical plan view of a filter-press frame.

The filter-press frame, as illustrated in Fig. 3, comprises the sides 32 and 33, the bottom 34 and the top 35, being held together by the bolt-irons 36, 36. A hole 37 passes through the side 32 and is connected by the conduit 38 to the space 39 inclosed by the frame.

When the frames and the plates are in position, the holes 23, 23 of the plates are in alinement with the holes 40, 40 of the frames; the holes 25, 25 and holes 41, 41 are in alinement and holes 37, 37 and 27, 27 are in alinement.

Filter press cloths 42, 42 are placed between the plates and the frames.

The operation of the device is as follows:—

The material to be filtered is forced through the conduit formed by the holes 27, 27, 37, 37 and through the conduits 38, 38 into the chambers 39, 39. The flow of material is then interrupted and water forced through the conduit formed by the holes 23, 23, 40, 40 through the field-conduits 18, 18 whence it passes through the conduits 28, 28 into and through the material, downwardly into the conduit 20 and outwardly through the conduit 21 to the faucet 22.

Wash water may also be forced through the conduit formed by the holes 25, 25, 41, 41, the conduits 26, 26 the conduits 19, 19, the conduits 29, 29 into and through the material.

In the washing downwardly it is evident that the success of the operation is dependent upon the quantity, regularity and pressure of the wash water passing through the conduits 28, 28 and these conditions are obtained in their maximum degrees by having the field conduits 18, 18 of larger cross-sectional areas than the conduits 24, 24 leading into them, thus maintaining a reservoir of water, the pressure of which is uniform throughout the entire width of the field, thus insuring a uniform flow through all of the conduits 28, 28 and hence throughout the entire material mass, producing a complete washing in a minimum of time.

The formation of the field-conduit is much easier and simpler and more readily produced, especially in large plates, than the field-conduits now employed, as it is not necessary to bore holes in each plate so exactly that they will aline with each other, the tongue and groove formation of my device being much simpler of construction.

In the drawings, I have shown my field-conduit at the top of the field and the ordinary field-conduit at the bottom of the field, but it is evident that both devices may be of my construction.

I do not limit myself to the particular size, shape, number or arrangement of parts as described and shown, all of which may be varied without going beyond the scope of my invention as described and claimed.

What I claim is:—

1. In a filter press plate, in combination, a supporting frame, a field within the frame and a longitudinal recess within the upper portion of the field whereby the upper portion of the frame will form a conduit with the field recess.

2. In a filter press plate, in combination, a supporting frame, a field comprising a plurality of field members within the frame and a longitudinal recess within the upper portion of the field whereby the upper portion of the frame will form a conduit with the field recess.

3. In a filter press plate, in combination, a supporting frame, a movable field within the frame, and a longitudinal recess within the upper portion of the field whereby the upper portion of the frame will form a conduit with the field recess.

4. In a filter press plate, in combination, a supporting frame, a movable field comprising a plurality of field members within the frame, and a longitudinal recess within the upper portion of the field whereby the upper portion of the frame will form a conduit with the field recess.

5. In a filter press plate, in combination, a supporting frame, a field within the frame, a longitudinal recess within the upper portion of the field and a longitudinal tongue carried by the upper portion of the frame fitting within the field recess and leaving a conduit therewith.

6. In a filter press plate, in combination, a supporting frame, a field comprising a plurality of field members within the frame, a longitudinal recess within the upper portion of the field and a longitudinal tongue carried by the upper portion of the frame fitting within the field recess and leaving a conduit therewith.

7. In a filter press plate, in combination, a supporting frame, a movable field within the frame, a longitudinal recess within the upper portion of the field and a longitudinal tongue carried by the upper portion of the frame fitting within the field recess and leaving a conduit therewith.

8. In a filter press plate, in combination, a supporting frame, a movable field comprising a plurality of field members within the frame, a longitudinal recess within the upper portion of the field and a longitudinal tongue carried by the upper portion of the frame fitting within the field recess and leaving a conduit therewith.

9. In a filter press plate, in combination, a supporting frame comprising two side members, a top member, means for maintaining the frame members in rigid construction, a field within the frame, a longitudinal recess within the upper portion of the field and a longitudinal tongue carried by the top member fitting within the field recess and leaving a conduit therewith.

10. In a filter press plate, in combination, a supporting frame comprising two side members, a top member, means for maintaining the frame members in rigid construction, a field comprising a plurality of field members within the frame, a longitudinal recess within the upper portion of the field and a longitudinal tongue carried by the top member fitting within the field recess and leaving a conduit therewith.

11. In a filter press plate, in combination, a supporting frame comprising two side members, a top member, means for maintaining the frame members in rigid construction, a movable field within the frame, a longitudinal recess within the upper portion of the field and a longitudinal tongue carried by the top member fitting within the field recess and leaving a conduit therewith.

12. In a filter press plate, in combination, a supporting frame comprising two side members, a top member, means for maintaining the frame members in rigid construction, a movable field comprising a plurality of field members within the frame, a longitudinal recess within the upper portion of the field and a longitudinal tongue carried by the top member fitting wthin the field recess and leaving a conduit therewith.

Signed at New York city in the county of New York and State of New York this 17th day of January, 1919.

GEORGE F. MILLER.